United States Patent
Maennel

(10) Patent No.: US 9,116,928 B1
(45) Date of Patent: Aug. 25, 2015

(54) IDENTIFYING FEATURES FOR MEDIA FILE COMPARISON

(75) Inventor: Hartmut Maennel, Zurich (CH)

(73) Assignee: Google Inc., Mountain View, CA (US)

( * ) Notice: Subject to any disclaimer, the term of this patent is extended or adjusted under 35 U.S.C. 154(b) by 406 days.

(21) Appl. No.: 13/315,753

(22) Filed: Dec. 9, 2011

(51) Int. Cl.
*G06F 7/00* (2006.01)
*G06F 17/30* (2006.01)

(52) U.S. Cl.
CPC .... *G06F 17/30286* (2013.01); *G06F 17/30244* (2013.01); *G06F 17/30247* (2013.01)

(58) Field of Classification Search
CPC .............. G06F 17/30067; G06F 17/30244; G06F 17/30247
USPC .......................................................... 707/821
See application file for complete search history.

(56) References Cited

U.S. PATENT DOCUMENTS

| | | | |
|---|---|---|---|
| 6,072,903 A * | 6/2000 | Maki et al. ................. 382/190 |
| 6,178,272 B1 * | 1/2001 | Segman .................... 382/298 |
| 6,675,174 B1 * | 1/2004 | Bolle et al. ..................... 1/1 |
| 6,990,453 B2 * | 1/2006 | Wang et al. ................ 704/270 |
| 2002/0076310 A1 * | 6/2002 | Knapik et al. ........... 414/416.03 |
| 2003/0055516 A1 * | 3/2003 | Gang et al. .................. 700/94 |
| 2006/0088096 A1 * | 4/2006 | Han et al. ............... 375/240.03 |
| 2006/0277047 A1 * | 12/2006 | DeBusk et al. ............. 704/273 |
| 2009/0013405 A1 * | 1/2009 | Schipka ..................... 726/22 |
| 2010/0076911 A1 * | 3/2010 | Xu et al. ..................... 706/12 |
| 2010/0092091 A1 * | 4/2010 | Kanda ....................... 382/190 |
| 2010/0220906 A1 * | 9/2010 | Abramoff et al. ........... 382/130 |
| 2011/0276157 A1 * | 11/2011 | Wang et al. .................. 700/94 |

* cited by examiner

*Primary Examiner* — Loan T Nguyen
(74) *Attorney, Agent, or Firm* — Fish & Richardson P.C.

(57) ABSTRACT

Embodiments of the disclosed subject matter construct linear combinations of a set of defined "basic" features for each pair of sample and known media files. The linear combination of those features that give the optimal correlation coefficients (i.e., most-correlated) is then found. The highest correlation coefficients then indicate the "best" features to use in detecting a match of the sample file.

20 Claims, 2 Drawing Sheets

IDENTIFYING FEATURES FOR MEDIA FILE COMPARISON

BACKGROUND

In various applications it may be desirable to find similarities between a new or sample media file and one or more other media files. For example, such a comparison may be useful in identifying copyrighted audio or video files, such as in the context of a website that allows users to upload such media files, to identify potential infringement. To do so, some techniques use hashes that characterize the media files or portions of the media files, for example at or near a given time point within the media file. Such techniques may be limited as the number of known media files grows, or as media files become larger. For example, as the number of media files grows, a high number of matching hashes may be retrieved for a given portion of a media file. However, many of the retrieved hashes may not represent true matches to the given media file segment. It may be difficult to identify desirable hashes to use for the comparison. For example, some media files may include segments that result in hashes that are often matched to new media files, but that do not necessarily indicate a good match between the content in those files.

BRIEF SUMMARY

Embodiments of the disclosed subject matter include techniques, systems, and computer-readable media configured to obtain a plurality of media file feature definitions, each definition associated with a hash of media file content. A plurality of linear combinations of the plurality of media file feature definitions may be generated, where each combination is associated with a plurality of feature coefficients. Each of the linear combination may be applied with respect to a sample media file and a reference media file to generate a correlation coefficient for the linear combination, [We use the correlation coefficient to measure the "benefit" of a linear combination. But what we are interested in are the linear combinations.] Preferred linear combinations may be determined based upon the correlation coefficients. Media file features corresponding to the preferred linear combinations may be identified (i.e. hash functions are based on these new features, which are linear combinations of the old, raw, features), and used to determine whether the sample media file contains media substantially equivalent to media contained in the first reference media file. The linear combinations may exclude known false positive matches between the media file features apparent in the sample media file and in the reference media file. Embodiments also may exclude linear combinations which have a variance below a defined threshold. The sample media file may be, for example, a video file provided by an end user. The first reference media file may be, for example, a copyrighted media file, and the sample media file may be a media file to be tested for the presence of content that is substantially similar to content in the first reference media file.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
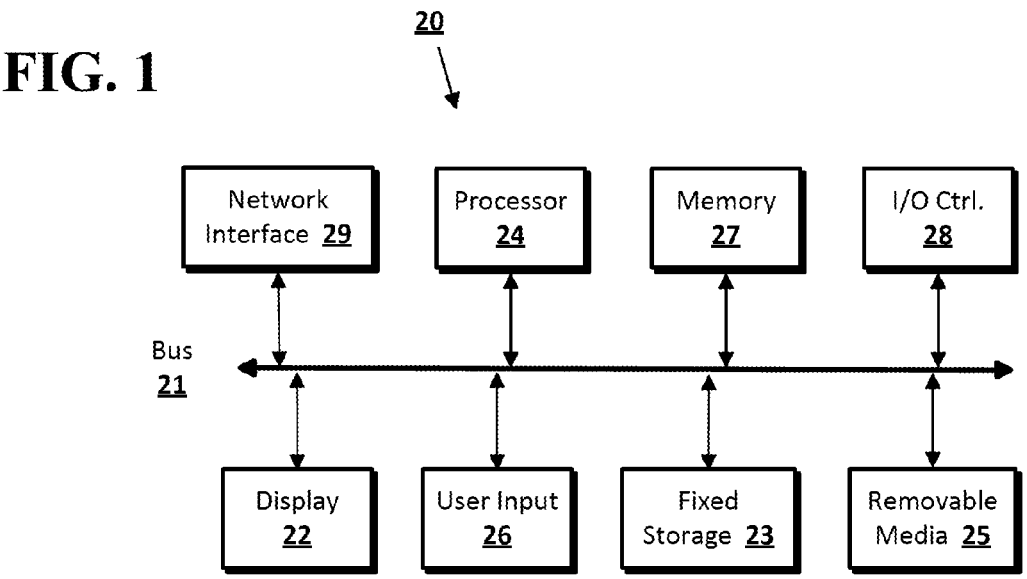
FIG. 1 shows a computer according to an embodiment of the disclosed subject matter.

As a collection of media files grows, it may become more difficult to effectively find candidate features within the media files to compare to new media files, and thereby identify similar or matching media files. Even if a particular set of "features" are given, it may not be apparent how the features used in a hash function may be selected or combined to obtain a useful or best performance in matching media files. A technique to do so may use labeled data, such as pairs of media files that human observers have identified as "matching" or "non-matching". According to embodiments of the disclosed subject matter, such labeled data or other feature sets may be used efficiently to generate effective feature combinations.

"Features" within a media file may define one or more hashes that characterize a portion of the media file at or around a given time point within the media file. In an embodiment, a "feature" may be designated or otherwise associated with a real number, whereas a "hash" may be designated by or otherwise associated with an integer. Thus, it may be possible for two features to be similar (approximately the same), whereas two hashes may be either exactly the same or not, i.e., hashes may not be referred to as having various degrees of similarity as may be appropriate to features. Several such hash functions may be combined to define a larger hash. For example, a set of eight single-hex-digit hashes may be combined to form a four-byte hash function. Other types and sizes of hashes may be used. Generally, the quality or usefulness of the resulting hashes may depend on how well the features are correlated for "matching" pairs of features between a sample (new) media file and one or more reference (known) media files, compared to a similar correlation in random pairs.

An embodiment of the disclosed subject matter constructs linear combinations of a set of defined features for each pair of sample and known media files. The linear combination of those features that give the optimal correlation coefficients (i.e., most-correlated) is then found. The highest correlation coefficients then indicate the "best" or preferred features to use in detecting a match of the sample file. More generally, a higher correlation coefficient indicates a feature that is more likely to reliably indicate whether a portion of a sample media file matches a portion of a known media file. Techniques as disclosed herein may be viewed as contrasting the probability that a set of hashes for a sample media file matches a known media file, with the probability that it matches random values. Embodiments of the disclosed subject matter may scale linearly with respect to the number of media files and time point pairs, and thus may scale to relatively very large sets of data. Embodiments of the disclosed subject matter also may use regularization and/or "must not match pairs" that evaluate a first version of the hashes to improve the reliability of the technique based on observed errors.

Figure 3:
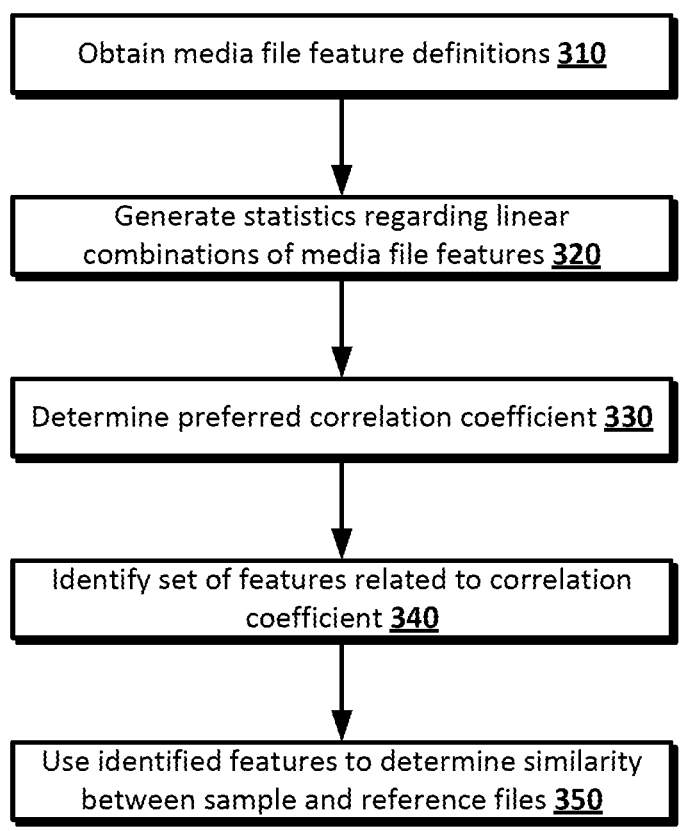
FIG. 3 shows an example process according to an embodiment of the disclosed subject matter.

FIG. 3 shows an example process according to an embodiment of the disclosed subject matter. At 310, media file feature definitions may be obtained, where each definition is associated with features of media file content. The feature definitions may be preselected from a larger set of potential features, based upon automatic filtering criteria, human-selected attributes, or any other suitable criteria. At 320, statistics such as, for example, the average value of the raw features, their variances, and/or covariance for pairs of matching and non-matching media files may be generated. A sample media file may be, for example, a media file that is to be tested against a set of preexisting media files to determine if a portion of the sample media file is substantially or exactly similar to a portion of a preexisting media file. As a more specific example, the sample media file may be a media file such as a video or audio file provided by a user, such as where the user uploads the media file to a media sharing website. In this example, the known media files may be copyrighted video, audio, or other media files, against which the uploaded media file is to be compared to identify potential infringing content.

At 330, one or more preferred correlation coefficients may be determined based upon the statistics generated at step 320. A "preferred" coefficient may be one that is closest to 1 out of the potential coefficients for the linear combinations. More generally, a "preferred" coefficient may be a coefficient that is closer to 1 than at least one other coefficient for the linear combinations. More generally, an embodiment may consider vector spaces of linear combinations and find an optimal or preferred d-dimensional vector space. That is, for each dimension d a d-dimensional vector space of linear combinations, such that the minimum over it's the correlation coefficients of linear combinations is maximal. Based upon the optimal correlation coefficient identified at 330, preferred linear combinations may be identified among those generated at step 320. The preferred linear combinations are those that result in the optimal correlation coefficient. These combinations then indicate, at 340, the appropriate set of features to be used in determining whether the sample media file contains content that is substantially similar to content contained in the reference media file. Once the features have been identified, at 350 they may be used to determine whether the sample media file contains media substantially equivalent to media contained in the reference media file. For example, if the same features appear in the sample and reference media files, it may be determined that a portion of the sample media file is substantially similar to a portion of the reference media file. Thus, the linear combinations of features generated at 320 may be used to efficiently select a set of features to use in determining whether a sample media file, or a portion of the sample media file, is substantially similar to a reference media file or a portion of the reference media file.

As a specific, non-limiting example, an initial set of features may include any number of features, such as 1000 features. A set of preferred linear combinations of those features may be limited to the highest-rated, most preferred, or otherwise "best" combinations. As disclosed herein, in an example configuration 64 linear combinations may be used. Each of the 64 linear combinations may be specified by 1000 coefficients, one coefficient for each feature, allowing for a set of 64,000 values that can be used in conjunction with feature values to consider similarities between media files.

Embodiments of the disclosed subject matter may provide additional benefit because the linear combinations of features may be static or invariant with respect to the specific sample and reference media files being used. Thus, the only variation may be in the values associated with the features for each pair of media files. In the specific example given above, the 64,000 coefficients (64 linear combinations, each with 1000 coefficients) may be constant regardless of the specific media files being considered. For each time point in each media file, the features may take different values and, therefore, the evaluated linear combinations may ultimately have different values despite the invariance of the coefficients.

To aid in understanding the operation of techniques disclosed herein, a mathematical derivation of the linear combination and correlation coefficient operations will be described. Other techniques and operations may be used without departing from the scope of the disclosed subject matter.

Initially, it may be presumed that there will be a relatively high correlation between a sample media file and a reference media file for which there should be a match, i.e., which contain substantially or exactly similar content, when compared to a correlation between the sample media file and arbitrary data. Thus, the technique generates linear combinations X and Y for the sample and reference media files, respectively, for which the correlation coefficient r should be as close to 1 as possible:

$$X = \sum_i \alpha_i x_i, \quad Y = \sum_i \alpha_i y_i$$

$$r = \frac{\text{CoVar}(X, Y)}{\sqrt{\text{Var}(X)} \cdot \sqrt{\text{Var}(Y)}}$$

Where the covariance and variance have the conventional definitions of:

$$\text{CoVar}(X, Y) := \frac{1}{N} \sum_{n=1}^{N} (X^{(n)} - \overline{X})(Y^{(n)} - \overline{Y}) = \frac{1}{N} \sum_{n=1}^{N} X^{(n)} Y^{(n)} - \overline{X}\,\overline{Y}$$

$$\text{Var}(X) := \frac{1}{N} \sum_{n=1}^{N} (X^{(n)} - \overline{X})^2 = \frac{1}{N} \sum_{n=1}^{N} (X^{(n)})^2 - \overline{X}$$

The sum is taken over a set of values $X^{(n)}, Y^{(n)}$, with n being an index of media file offset pairs that should match as described above. The variances and covariances are independent of adding a constant to X or Y. Because different features will be compared, they may be adjusted to have a mean of 0:

$$X = \sum_i \alpha_i (x_i - \overline{x}_i), \quad Y = \sum_i \alpha_i (y_i - \overline{y}_i).$$

By assuming that the samples and references have approximately the same distribution, r then becomes $$r = \frac{\text{CoVar}(X, Y)}{\text{Var}(X)} = \frac{\sum_i \sum_j \alpha_i \alpha_j \cdot \text{CoVar}(x_i, y_j)}{\sum_i \sum_j \alpha_i \alpha_j \cdot \text{CoVar}(x_i, x_j)}$$

Where $\text{CoVar}(x_i, x_i)$ is the same as $\text{Var}(x_i)$. This can be viewed as a calculation to determine the best $a_i$ given the measured $\text{CoVar}(x_i, x_j)$ and $\text{CoVar}(x_i, y_j)$. In an illustrative example, the former may contain about 1000 values, whereas the latter may include 2 million values, independent of the number of matching media file segments (e.g., video frames) being considered.

Let $\vec{a}$ be the vector of the unknown coefficients $a_i$, and C the matrix of the numbers $\text{CoVar}(x_i,y_i)$, and V the matrix of $\text{CoVar}(x_i,x_j)$. The desired value is then the value of as that maximizes r for known matrices C and V:

$$r = \frac{\vec{a}^T C \vec{a}}{\vec{a}^T V \vec{a}} \quad \text{(Equation 1)}$$

By construction, V is a positive definite symmetric matrix. C also may be expected to be symmetric, by assuming that "x matches y" is equivalent to "y matches x". This constraint may be enforced by using each pair both as (x, y) and (y, x) or, equivalently, by using each pair only once but replacing C by the average of C and $C^T$. It also may be assumed that this is positive definite. However, this may not be guaranteed, and numerically there may be a few eigenvalues which are negative and relatively very small (e.g., with an absolute value less than $10^{-16}$). This also may be caused by rounding errors in the computation. To ensure that V is also positive definite, a very small constant amount (e.g., $10^{-16}$) may be added in the diagonal.

For positive definite symmetric matrices V,C there are spectral decompositions $$V = Q_1 \cdot T_1 \cdot Q_1^{-1}, C = Q_2 \cdot T_2 \cdot Q_2^{-1}$$

With Qi orthogonal matrices (so $Q_i^{-1} = Q_1^T$) and $T_i$ a diagonal matrix with positive entries. The diagonal matrix $D_i$ may be set such that $D_i^2 = T_i$, and the following may be set:

$$B_i := D_i \cdot Q_i^{-1} = D_i \cdot Q_i^T$$

such that $B_1^T \cdot B_1 = V$ and $B_2^T \cdot B_2 = C$. Then for $$\vec{b} := B_1 \vec{a},$$

$$r = \frac{(B_1^{-1}\vec{b})^T B_2^T B_2 (B_1^{-1}\vec{b})}{\vec{b}^T \vec{b}} = \frac{\vec{b}^T (B_1^{-1})^T B_2^T B_2 B_1^{-1} \vec{b}}{\|\vec{b}\|^2} = \frac{\|B_2 B_1^{-1} \vec{b}\|^2}{\|\vec{b}\|^2}$$

Since $\vec{a} \neq 0$ was selected arbitrarily, $\vec{b}$ is also arbitrary, and the maximal r is given by the largest eigenvalue of $M^T M$, where $M = B^2 B^{1\gamma} - 1$).

The eigenvectors $\vec{v}$, $\vec{v}'$ for different eigenvalues are orthogonal. For $\vec{a} = B_1^{-1} \vec{v}$ $\vec{a}' = B_1^{-1} \vec{v}'$:

$$\vec{a}^T V \vec{a}' = \vec{a}^T B_1^T B_1 \vec{a}' = \langle \vec{v}, \vec{v}' \rangle = 0$$

This indicates that the corresponding combination features $$X = \sum_i a_i(x_i - \bar{x}_i), \ X' = \sum_i a_i'(x_i - \bar{x}_i).$$

are uncorrelated:

$$0 = \vec{a}^T V \vec{a}' = \sum_{i,j} a_i V_{ij} a_j' = \sum_{i,j} a_i \mathbb{E}\left((x_i - \bar{x}_i)(x_j - \bar{x}_j)\right) a_j'$$

$$= \mathbb{E}\left(\sum_{i,j} a_i(x_i - \bar{x}_i)(x_j - \bar{x}_j) a_j'\right)$$

$$= \mathbb{E}\left(\left(\sum_i a_i(x_i - \bar{x}_i)\right)\left(\sum_j a_j'(x_j - \bar{x}_j)\right)\right) = \text{CoVar}(X, X')$$

Thus, a reasonable entropy may be expected for embodiments of the disclosed subject matter, with normalized combination features from the eigenvalues described above. This may be expected because the low entropy results from a correlation between features.

A subset of all possible eigenvalue solutions may be used to identify preferred features to use when determining whether media files match reference files. For example, in an embodiment the top 64 eigenvalues may be used. It has been found that in some circumstances, using eigenvalues below the top 64 provides little or no additional benefit. It will be understood that the 64 value limit is provided only as an illustrative example, and in general any number of values may be used.

In an embodiment, "must-not-match" feature pairs may be used to further refine the selection of preferred features to use when determining whether a sample media file matches a reference media file. These features may be, for example, features that have been determined to be likely to lead to false-positive matches.

If X is used to denote a combined feature and (X, Y) a pair of values obtained for matching media files, the prior derivation maximizes the average of $(X-\hat{Y}) \cdot (Y-\hat{Y})$ compared to the average of $(X-\hat{X})^2$ (which is equivalent to the average of $(Y-\hat{Y})^2$). In the best case, Y is almost the same as X, so the averages are relatively close together. However, if X and Y are allowed to run independently over randomly sampled media files or media file segments, the average of $(X-\bar{X})(Y-\bar{Y})$ should be the product of the averages of $(X-\hat{X})$ and $(Y-\hat{Y})$, i.e., 0.

The previously-described techniques may be used to find matches, which then may be further evaluated such as by an automated process or by human inspection. False positives, i.e., media file pairs that are identified as matching but do not in fact match, may be tracked or assembled t provide another useful data set. The covariance matrix $C_{fp}$ of the false positive set may be used to modify the technique. Specifically, If (X, Y) run over pairs in the false positives list, there may be some combinations that have a positive correlation (because the pairs were found based on matching combinations), although the pairs did not really match. The denominator of Equation 1 may then be set to $\vec{a}^T C_{fp} \vec{a}$, which then gives the ratio of the correlation coefficients on "true" positives and "false" positives instead of r. This may then be optimized that the combinations "are more similar for matching pairs than for non-matching pairs". However, since the false positives are a relatively small and biased sample of all media files that do not match, $C_{fp}$ should be used as a "correction" to V, i.e., the following should be optimized for some constant $\eta > 0$ instead of Equation 1:

$$\frac{\vec{a}^T C \vec{a}}{\vec{a}^T (V + \eta \cdot C_{fp}) \vec{a}}$$

As previously described, it may be presumed that "if media files a and b do not match, then b and a also don't match", and $C_{fp}$ may be enforced to be symmetric by replacing it with the average of $C_{fp}$ and its transpose.

In an embodiment, a correction may be made to avoid false indications that may arise, for example, in combinations that happen to have a very low variance. The correction may remove unreliable features from those used to compare a sample media file to a reference media file or provide other analytical benefits. For example, if the measured variance of a linear combination is several orders of magnitude below the variance of one term in this linear combination, a slight measuring error in this term will give relatively very large error in the linear combination when the features are normalized to have a variance of 1. In some cases, these features may not be reliable, so it may be useful to exclude features with extremely low variance. An example technique for doing so may be to add a small constant to the diagonal elements of the denominator, i.e., take as a matrix in the denominator $$V + \eta \cdot C_{fp} + \mu \cdot I \eta > 0, \mu > 0$$

where I is the identity matrix. The value $\mu$ may be chosen such that the resulting eigenvalues are relatively significantly positive; this also enforces the constraint that the matrix is positive definite. This results in a new positive definite symmetric matrix, so that now $$\tilde{B}_1^T \tilde{B}_1 = V + \eta \cdot C_{fp} + \mu \cdot I$$

In an embodiment, $\eta$ should be, for example, relatively small, but large enough to remove at least some of the false positives. As another example, $\eta$ may be chosen such that the highest absolute value of an eigenvalue of $\eta C_{fp}$, is about 1/10 of the highest eigenvalue of V.

This may be used to get the orthogonal eigenvectors as previously described. The eigenvectors $\vec{v}_1, \ldots, \vec{v}_n$ to the n largest eigenvalues $$\lambda_1 \geq \ldots \geq \lambda_n > 0$$

span a vector space $V_n$ of dimension n in which $$\|\tilde{M}\vec{v}\|^2 \geq \lambda_n \|\vec{v}\|^2 \text{ for all } \vec{v} \in V_n$$

This has the consequence that for all $\vec{a} \in \tilde{B}_1^{-1} V_n$, for $\vec{v} := \tilde{B}_1 \vec{a} \in V_n$, $$\lambda_n \leq \frac{\|\tilde{M}\vec{v}\|^2}{\|\vec{v}\|^2} = \frac{\|B_2 \vec{a}\|^2}{\|\tilde{B}_1 \vec{a}\|^2} = \frac{\vec{a}^T B_2^T B_2 \vec{a}}{\vec{a}^T \tilde{B}_1^T \tilde{B}_1 \vec{a}} = \frac{\vec{a}^T C \vec{a}}{\vec{a}^T (V + \eta \cdot C_{fp} + \mu \cdot I) \vec{a}}$$

The fact that different eigenvectors $\vec{v}$ of $\tilde{M}^T \tilde{M}$ are orthogonal no longer means that the combinations corresponding to $\vec{a} = \tilde{B}_1^{-1} \vec{v}$ are uncorrelated, because $\tilde{B}_1^T \tilde{B}_1$ is no longer equivalent to V. Because the vector space $\tilde{B}_1^{-1} V_n$ contains "good" combinations an orthonormal basis may be computed with respect to the quadratic form given by the variance $V = B_1^T B_1$:

$$\begin{array}{ccc} V_n & \tilde{B}_1^{-1} V_n & B_1 \tilde{B}_1^{-1} V_n \\ \omega & \omega & \omega \\ \vec{v}_1, \ldots \vec{v}_n & \xrightarrow{\tilde{B}_1^{-1}} \vec{a}_a, \ldots, \vec{a}_n & \xrightarrow{B_1} \vec{b}_1, \ldots, \vec{b}_n \\ & & \downarrow \text{orthonormalize} \\ \vec{a}'_i \ldots \vec{a}'_n & \xleftarrow{\tilde{B}_1^{-1}} & \vec{b}'_1, \ldots, \vec{b}'_n \end{array}$$

-continued $$\frac{\|\tilde{M}\vec{v}\|}{\|\vec{v}\|} \geq \lambda_n \qquad \frac{\|B_2 \vec{a}\|}{\|\tilde{B}_1 \vec{a}\|} \geq \lambda_n$$

$$\vec{a}_i^T V \vec{a}'_j = \delta_{ij} \qquad \langle \vec{b}'_i, \vec{b}'_j \rangle = \delta_{ij}$$

For a basis $\vec{a}'_i := \tilde{B}_1^{-1} \vec{v}_i$, an orthonormal basis $\vec{b}'_1, \ldots, b_n'$ of $B_1 \tilde{B}_1^{-1} V_n$ may be found. Then are a basis of $\tilde{B}_1^{-1} V_n$ such that for corresponding feature combinations, there exists the covariance $$\vec{a}'_i V \vec{a}'_i = \vec{a}'_i = \langle B_1 \vec{a}'_i, B_1 \vec{a}'_j \rangle = \langle \vec{b}'_i, \vec{b}'_j \rangle = \delta_{ij}$$

Again, the corresponding feature combinations are uncorrelated, and have a variance of 1.

To test the techniques disclosed herein, a set of coefficients were trained on 20% of a set of must-match pairs and 40% of must-not-match pairs, and tested on the other 40% of each, for a test set of video media files. In the sample data set, this included 141 false positive video files and 407 correct matches. The results were compared against randomly-chosen features. Because the randomly-chosen features have lower entropy than the orthogonal new feature combinations, six groups of new features were compared against eight groups of old features.

In each group of features, the index of the largest feature was computed. It was then determined whether in all groups the index was the same for corresponding video frames in a pair. The comparison considered three criteria: the number of video segments with zero matches; the number of segments with more, the same, or fewer matches; and the number of "interesting" clips with "significantly more or fewer" matches. For purposes of the test, "interesting" clips were considered those where at least one version had less than 10% matches, and "significant" to indicate a difference of at least 2, and more than 5%.

The results of the test were as follows:

| Quantity | True Matches | False Positives |
| --- | --- | --- |
| Zero matches old | 321 (78%) | 129 (91%) |
| Zero matches new | 283 (69%) | 141 (100%) |
| More matches | 102 (25%) | 0 (0%) |
| Same number of matches | 269 (66%) | 129 (91%) |
| Fewer matches | 36 (8%) | 12 (8%) |
| Interesting, more | 56 (13%) | 0 (0%) |
| Uninteresting | 339 (83%) | 137 (97%) |
| Interesting, less | 12 (2%) | 4 (2%) |

This test was performed comparing raw features, which were selected to have a certain distance to avoid low entropy resulting from the correlation between nearby features, against new combination features. This test may be considered relatively simple, because normally feature wavelet coefficients are used instead of the raw features. The difference is relative small because, for example, for the false positives there are already 0 matches in all but 12 of the 141 video clips.

Another measurement was performed using fewer groups to have a larger number of interesting cases, and using Haar wavelet coefficients, normalized by dividing by the square root of the number of used coefficients. In a comparison of the "old" (Haar square root), with 4 groups of 15 features, to "new" ("optimal") combination of features, with 3 groups of 12 features, the following results were obtained:

| Quantity | True Matches | False Positives |
|---|---|---|
| Zero matches old | 49 (12%) | 94 (66%) |
| Zero matches new | 19 (4%) | 116 (82%) |
| More matches | 291 (71%) | 19 (13%) |
| Same number of matches | 21 (5%) | 82 (58%) |
| Fewer matches | 95 (23%) | 40 (28%) |
| Interesting, more | 232 (57%) | 5 (3%) |
| Uninteresting | 110 (27%) | 112 (79%) |
| Interesting, less | 65 (15%) | 24 (17%) |

Similar tests which replaced "False Positives" with "random pairs" were performed, and provided similar results.

Embodiments of the presently disclosed subject matter may be implemented in and used with a variety of component and network architectures. FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
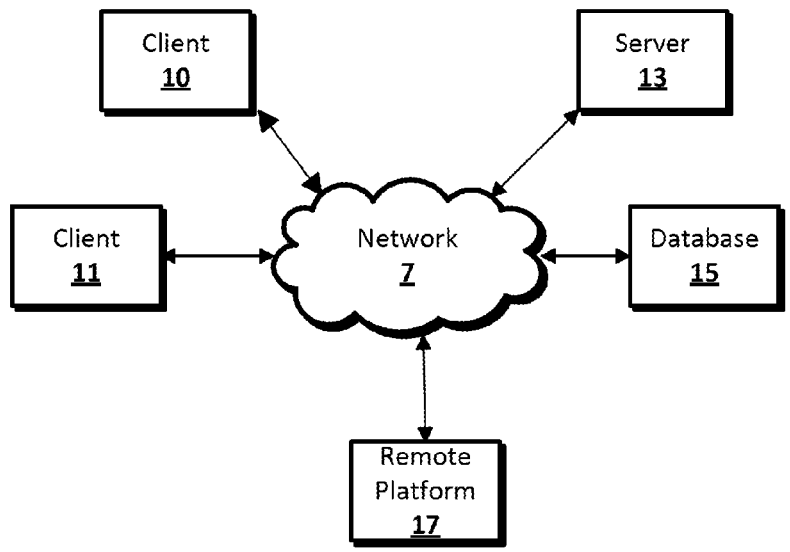
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
selecting multiple different subsets of features of media content, from among a defined set of features of media content;
generating, for each of the multiple different subsets of features, a respective linear combination of the features;
for each linear combination of the features, comparing a sample item of media content to pre-existing items of media content, including items of media content that are labeled as matching the sample item of media content and items of media content that are labeled as not matching the sample item of media content, to generate a respective value for each feature of the linear combination, for each pre-existing item of media content that the sample item of media content is compared against;
for each linear combination of the features, generating a correlation coefficient based on the respective value for each feature of the linear combination, wherein a correlation coefficient is a value that reflects a reliability of the linear combination in indicating a match or mismatch between a pair of items of media content;
selecting a particular linear combination of the features based at least on the correlation coefficient for the particular linear combination of the features; and
using the particular linear combination of the features in determining whether the another item of media content matches one or more of the pre-existing items of media content.

2. The method of claim 1, wherein selecting the particular linear combination of the features is further based on a variance of each linear combination of the features.

3. The method of claim 1, wherein the sample item of media content is a video provided by a user.

4. The method of claim 1, wherein the sample item of media content is a copyrighted media item, and the other item of media content is an item of media content to be tested for the presence of content that is substantially similar to content in the sample item of media content.

5. The method of claim 1, wherein a feature of media content is a hash value of a portion of an item of media content.

6. The method of claim 1, wherein the items of media content that are labeled as matching the sample item of media content and the items of media content that are labeled as not matching the sample item of media content are labeled by human observers.

7. The method of claim 1, wherein the linear combinations of the features is less likely to result in false positive matches between the features of the sample item of media content and of the other item of media content than at least one other linear combination of the features.

8. A system comprising:
one or more computers and one or more storage devices storing instructions that are operable, when executed by the one or more computers, to cause the one or more computers to perform operations comprising:
selecting multiple different subsets of features of media content, from among a defined set of features of media content;
generating, for each of the multiple different subsets of features, a respective linear combination of the features;
for each linear combination of the features, comparing a sample item of media content to pre-existing items of media content, including items of media content that are labeled as matching the sample item of media content and items of media content that are labeled as not matching the sample item of media content, to generate a respective value for each feature of the linear combination, for each pre-existing item of media content that the sample item of media content is compared against;
for each linear combination of the features, generating a correlation coefficient based on the respective value for each feature of the linear combination, wherein a correlation coefficient is a value that reflects a reliability of the linear combination in indicating a match or mismatch between a pair of items of media content;
selecting a particular linear combination of the features based at least on the correlation coefficient for the particular linear combination of the features; and
using the particular linear combination of the features in determining whether the another item of media content matches one or more of the pre-existing items of media content.

9. The system of claim 8, wherein selecting the particular linear combination of the features is further based on a variance of each linear combination of the features.

10. The system of claim 8, wherein the sample item of media content is a video provided by a user.

11. The system of claim 8, wherein the sample item of media content is a copyrighted media item, and the other item of media content is an item of media content to be tested for the presence of content that is substantially similar to content in the sample item of media content.

12. The system of claim 8, wherein a feature of media content is a hash value of a portion of an item of media content.

13. The system of claim 8, wherein the items of media content that are labeled as matching the sample item of media content and the items of media content that are labeled as not matching the sample item of media content are labeled by human observers.

14. The system of claim 8, wherein the linear combinations of the features is less likely to result in false positive matches between the features of the sample item of media content and of the other item of media content than at least one other linear combination of the features.

15. A non-transitory computer-readable medium storing software comprising instructions executable by one or more computers which, upon such execution, cause the one or more computers to perform operations comprising:
selecting multiple different subsets of features of media content, from among a defined set of features of media content;
generating, for each of the multiple different subsets of features, a respective linear combination of the features;
for each linear combination of the features, comparing a sample item of media content to pre-existing items of media content, including items of media content that are labeled as matching the sample item of media content and items of media content that are labeled as not matching the sample item of media content, to generate a respective value for each feature of the linear combination, for each pre-existing item of media content that the sample item of media content is compared against;
for each linear combination of the features, generating a correlation coefficient based on the respective value for each feature of the linear combination, wherein a correlation coefficient is a value that reflects a reliability of the linear combination in indicating a match or mismatch between a pair of items of media content;

selecting a particular linear combination of the features based at least on the correlation coefficient for the particular linear combination of the features; and using the particular linear combination of the features in determining whether the another item of media content matches one or more of the pre-existing items of media content.

16. The medium of claim 15, wherein selecting the particular linear combination of the features is further based on a variance of each linear combination of the features.

17. The medium of claim 15, wherein the sample item of media content is a copyrighted media item, and the other item of media content is an item of media content to be tested for the presence of content that is substantially similar to content in the sample item of media content.

18. The medium of claim 15, wherein a feature of media content is a hash value of a portion of an item of media content.

19. The medium of claim 15, wherein the items of media content that are labeled as matching the sample item of media content and the items of media content that are labeled as not matching the sample item of media content are labeled by human observers.

20. The medium of claim 15, wherein the linear combinations of the features is less likely to result in false positive matches between the features of the sample item of media content and of the other item of media content than at least one other linear combination of the features.

* * * * *